United States Patent [19]

Nishimune et al.

[11] Patent Number: 4,627,239

[45] Date of Patent: Dec. 9, 1986

[54] HYDRAULIC CIRCUIT ARRANGEMENT

[75] Inventors: Hisaaki Nishimune, Akashi; Yoshikuni Ichimura, Kobe; Kentaro Hata, Akashi, all of Japan

[73] Assignee: Kawasaki Jukogyo Kabushiki Kaisha, Kobe, Japan

[21] Appl. No.: 695,744

[22] Filed: Jan. 28, 1985

Related U.S. Application Data

[63] Continuation-in-part of Ser. No. 271,712, Jun. 8, 1981, abandoned.

[30] Foreign Application Priority Data

Jun. 6, 1980 [JP] Japan ............................ 55-79572[U]
Jun. 6, 1980 [JP] Japan ............................ 55-76893

[51] Int. Cl.[4] ........................ F16H 39/46; F15B 13/06

[52] U.S. Cl. ........................ 60/484; 60/428; 60/486; 91/461

[58] Field of Search ................ 60/420, 428, 430, 445, 60/447, 450, 452, 464, 484, 486, 488; 91/461; 417/216

[56] References Cited

U.S. PATENT DOCUMENTS

| | | | |
|---|---|---|---|
| 2,082,473 | 6/1937 | Tyler | 60/452 |
| 3,280,557 | 10/1966 | Sattavara | 60/428 |
| 3,526,468 | 9/1970 | Moon et al. | 417/216 |
| 3,866,420 | 2/1975 | Appel | 60/447 |
| 3,895,490 | 7/1975 | Pachins | 60/486 |
| 3,995,425 | 12/1976 | Wittren | 60/452 |
| 4,047,590 | 9/1977 | Hoashi et al. | 60/447 |
| 4,075,840 | 2/1978 | Jesswein | 60/484 |
| 4,204,405 | 5/1980 | Basham | 60/430 |
| 4,305,571 | 12/1981 | Hystad | 60/486 |
| 4,354,351 | 10/1982 | Dezelan | 60/464 |
| 4,382,485 | 5/1983 | Kirkham | 60/428 |

FOREIGN PATENT DOCUMENTS

| | | | |
|---|---|---|---|
| 725431 | 1/1966 | Canada | 60/484 |

*Primary Examiner*—Deborah L. Kyle
*Assistant Examiner*—Richard L. Klein
*Attorney, Agent, or Firm*—Jordan and Hamburg

[57] ABSTRACT

A hydraulic circuit arrangement for controlling a plurality of actuators connected to a high pressure line of a main pump parallel to each other has a sequence valve interposed in a line bypassing from the high pressure line to a reservoir. In the bypass line a throttle is interposed between the sequence valve and the reservoir. A regulator for controlling the displacement of the main pump is connected to the bypass line between the sequence valve and the throttle at a pilot chamber thereof. An auxilially pump is connected to the high pressure line parallel with the sequence valve. A delivery line of the auxilially pump has a bypass line interposed with a relief valve. The main pump may be switched to unloaded condition for the stand-by condition of the actuators and to loaded condition for the operation condition of the actuators.

3 Claims, 7 Drawing Figures

HYDRAULIC CIRCUIT ARRANGEMENT

This application is continuation-in-part of application Ser. No. 271,712, filed June 8, 1981, now abandoned.

BACKGROUND OF THE INVENTION

This invention relates to a hydraulic circuit arrangement comprising a plurality of actuators connected parallel to each other and to the high pressure line coming from the main variable displacement pump provided with a regulator for controlling a discharge rate with holding a pressure constant.

In general, the hydraulic circuit of such a construction (for simplify an expression "a parallel multiple circuit" is used hereinafter) is known as "Ring Main System" and is applied in particular, for the operation circuit of the hydraulic machinery for marine use and the like, and it is well known that the parallel multiple circuit largely contributes to integration of the oil hydraulic source and simplification of the pipe line arrangement.

FIG. 1 shows an example of the pipe line system according to the prior art to be applied for the parallel multiple circuit as above described in which the main variable displacement pump 1 is equipped with a regulator 2 for controlling the discharge rate with holding the pressure in constant. Said regulator 2 is provided with a pilot chamber 3 and serves to control the discharge rate of the main pump 1 depending on the balancing between the pilot pressure induced into the pilot chamber 3 through the pipe line 4 and the force of the spring 5. The oil delivered from the main pump 1 is led to a multiplicity of actuators 7, through the high pressure line 6 and the oil discharged from the actuators is returned to the tank 9 through the discharged oil return line 8. A sequence valve 10 is connected with its inlet port to the high pressure line 6 and with its outlet port to a reservoir or through a throttle 11. The pilot chamber 3 of the regulator 2 is connected with a line provided between the sequence valve 10 and the reservoir.

The actuators 7 to be connected to the parallel multiple circuit are normally so arranged that they work independently as long as the maximum capacity of the main pump 1 will permit and thus for such characteristics, the parallel multiple circuit arrangement is highly evaluated. Depending on the purposes of application of the actuators, however, there are such cases where the above advantageous characteristics of the parallel multiple circuit cannot be fully expected so long as it works in connection with the conventional devices. For instance, in case that the circuit is applied for an operation of the deck machinery for marine use, the actuators correspond respectively to windlasses and or mooring winches. And in such a ship mooring system, the time of the respective machines or apparatuses required for "stand-by" takes long and in many cases such "stand-by" time is rather longer than that for "operation". That is, the main pump 1 continues running even for "stand-by" time, in which case the pilot pressure working against the pilot chamber 3 of the regulator 2 through the sequence valve 10 may control the delivery of the main pump 1 to minimum while the delivery pressure transmitted to the high pressure line 6 may be maintained at a high pressure to be regulated by the sequence valve 10. In this way, even when the actuators 7 are not in an "operative" condition at all, the high pressure line 6 and the relative system are at all times kept at highly pressurized conditions, whereby such undesirable problems may be caused as noise, vibration and reduced life time of the main pump. This problem will be likely developed to such a serious one which cannot be left unsolved in particular when the parallel multiple circuit will be applied for such a mooring system as above described having a longer "stand-by" time.

Furthermore, should the actuators be required of being operated at over-loaded condition, i.e., should higher pressure be required for the high pressure line 6 than the pressure to be regulated by the sequence valve 10, there are such cases in which the delivery pressure of the main pump cannot meet the required high pressure.

FIG. 2 shows an example of the countermeasure in the past taken on the parallelly multiple circuit to avoid the above-mentioned problems, wherein the sequence valve 12 set at lower pressure is provided in addition to and in parallel with the sequence valve 10 and manual directional control valve 13 is provided for changing over flow directions between the sequence valves 10 and 12. Namely, while the actuators are at "stand-by", the directional control valve 13 is positioned as illustrated, the pipe line of the sequence valve 10 is shut and subsequently by reducing the delivery pressure of the main pump 1 to the lower pressure level to be regulated by the sequence valve 12 and by manually changing the directional control valve 13 at the time when the actuators are at "operative" condition, the delivery pressure of the main pump 1 may be brought to a high pressure condition to be regulated by the sequence valve 10. In this manner, the problems in maintaining the high pressure with the device shown in FIG. 1 at the time of "stand-by" may be managed in any way to be solved, while, however, it will be much complicated and difficult in practical operation of the mooring system to manually change over the directional control valve 13, depending on the multiplicy of the actuators being either in "operative" or "stand-by" conditions.

SUMMARY OF THE INVENTION

The object of the present invention is to overcome the difficulty inherent with the hydraulic circuit arrangement of the prior art and to provide the hydraulic circuit arrangement in which the sequence valve for controlling the regulator of the main pump automatically can be controlled depending on the conditions of the actuators "stand-by" or "operation".

The outstanding characteristics of the present invention are that an auxiliary pump having a delivery line connected with the high pressure line of the main pump and a relief valve interconnected between the delivery line and the reservoir are arranged and that the relief valve is set at a pressure higher than that to be regulated by the sequence valve.

In the present invention a second relief valve can be connected between the high pressure line of the main pump and the reservoir parallel to the sequence valve and a directional control valve is connected to a branch line connected to a pilot chamber of the second relief valve and the reservoir. By this construction the main pump may be switched to an unloaded condition when the actuators are in stand-by condition and may be switched to a loaded condition when the actuators are in operation condition.

PREFERRED EMBODIMENT OF THE INVENTION

Figure 1:
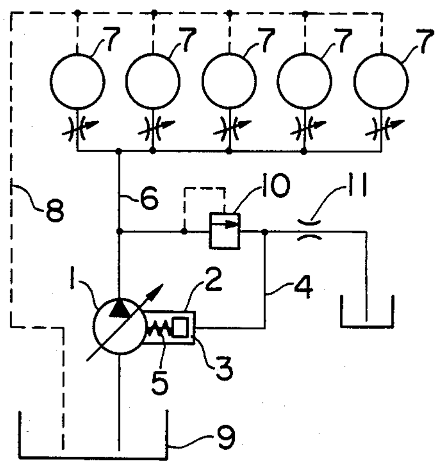
FIG. 1 PRIOR ART
FIG. 1 is a schematic diagram of the hydraulic circuit arrangement according to the prior art.

Preferred embodiments of the invention will now be described by referring to the drawings.

Figure 3:
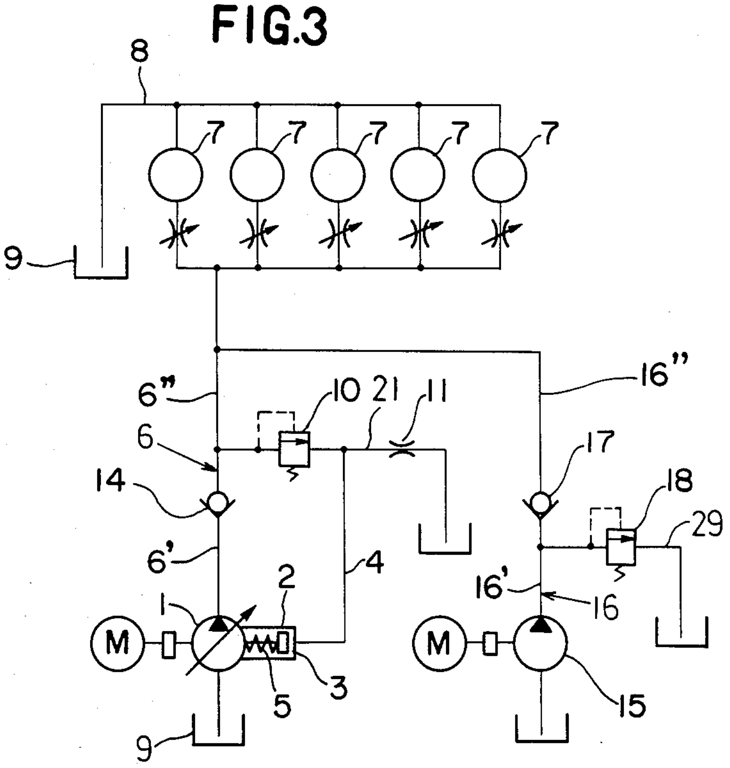
FIG. 3 is a schematic diagram of the hydraulic circuit arrangement according to the present invention.

In FIG. 3, the construction is equivalent to the one shown in FIG. 1, in that the delivery volume of the main pump 1 is controlled by the regulator 2 and the oil delivered from the main pump 1 is led to the actuators 7, through the high pressure line 6. A check valve 14 is interposed in the high pressure line 6 of the main pump 1. The high pressure line 6 is divided into two parts, namely an upper stream line 6' and a down stream line 6" by the check valve 14.

A sequence valve 10 is interposed in a line 21 connected to the down stream line 6" at its one end and to the reservoir at another end as like as in FIG. 1. In the line 21 a throttle 11 is interposed between the sequence valve 10 and the reservoir. A pilot chamber 3 of the regulator 2 is connected to the line 21 at a point between the sequence valve 10 and the throttle 11 through a pilot line 4. Therefore, the pilot pressure is introduced to the pilot chamber 3 from the sequence valve 10 under the influence of the throttle 11.

An auxiliary pump 15 is connected with the down stream line 6" of the high pressure line 6 through a delivery line 16. In the delivery line 16 a check valve 17 is interposed and the delivery line 16 is divided into two parts, namely an upper stream line 16' and a down stream line 16" by the check valve 17. Numeral 18 designates a relief valve which serves to regulate the delivery pressure from the auxiliary pump 15 and is interposed in a line 29 disposed between the upper stream line 16' of the delivery line 16 and the reservoir. The pressure to be regulated by the relief valve 18 is set at a higher level than the pressure to be regulated by the sequence valve 10. The delivery Q of the auxiliary pump 15 is so selected as to comply with the following requirement at the condition that the delivery pressure is to be regulated by the relief valve 18;

$$Q > [(\text{rate of fluid from the throttle } 11) + (\text{Leakage of fluid from the respective devices})]$$

Operation and the effect of the apparatus according to the present invention will be described as following. By activating the auxiliary pump 15 and keeping it thus operated, the main pump 1 will be activated. In this condition, for the pressure in the pilot chamber 3, the high pressure to be regulated by the relief valve 18 is already introduced thereto and as the result, the delivery of the main pump 1 is now almost zero, thereby enabling the starting current for the main pump 1 to be reduced. Then at the time of driving the actuators 7 the pressure in the down stream line 6" of the high pressure line 6 may be regulated by the sequence valve 10 and it will be reduced to the predetermined pressure. At the same time the delivered fluid from the auxiliary pump 15 will be added to the one delivered from the main pump 1 and supplied to the actuators 7, thus serving complementary to the function of the main pump. In case that the actuators 7 should be required of operation at an over-load condition, namely higher pressure should be required for the down stream line 6" of the high pressure line 6 than the pressure to be regulated by the sequence valve 10, by virtue of the auxiliary pump 15, it is also possible to operate the actuators at a low speed within the range of pressure to be regulated by the relief valve 18 and provided that the effective delivery volume Qe will stay at;

$$Qe = Q - [\text{Flow rate from the throttle } 11) + (\text{Leakage from the respective devices}]$$

Figure 4:
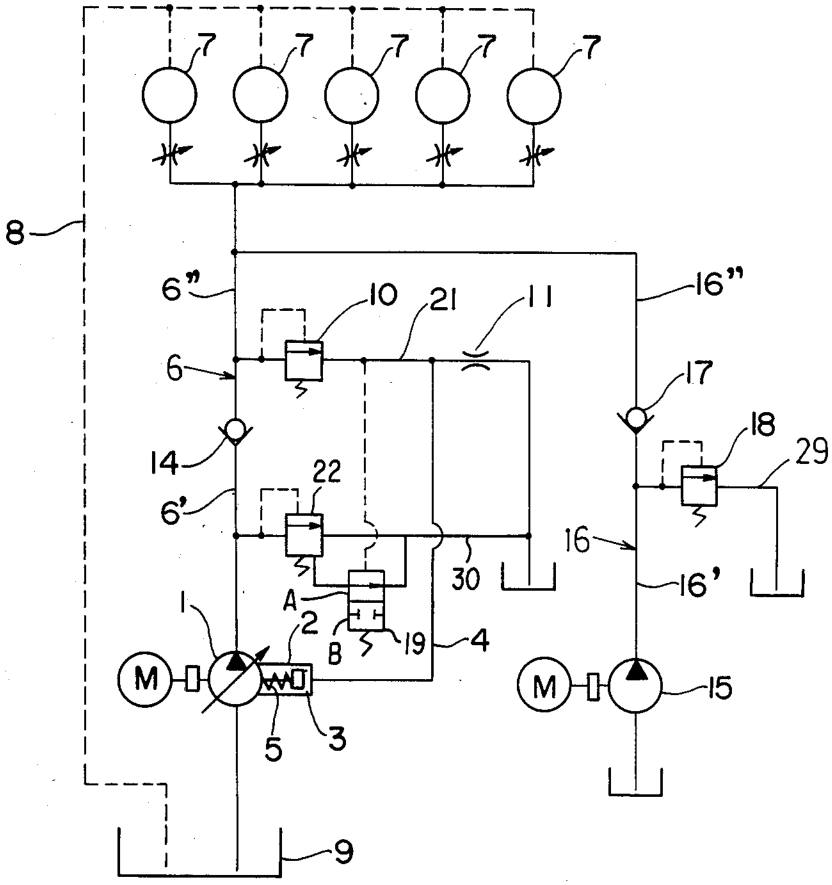
FIG. 4 is a schematic diagram of another embodiment of the apparatus according to the present invention.

In FIG. 4 the high pressure line 6 of the main pump 1 controlled by the regulator 2 is connected to the actuators 7 which are connected parallel with each other and the discharge line 8 of the actuators is connected with the reservoir 9 as same as the embodiment shown in FIG. 3. A check valve 14 is interposed in the high pressure line 6 of the main pump 1. The high pressure line 6 is divided into two parts, namely an upper stream line 6' and a down stream line 6" by the check valve 14.

A sequence valve 10 is interposed in a line 21 connected to the down stream line 6" at its one end and to the reservoir at another end as like as in FIG. 1. In the line 21 a throttle 11 is interposed between the sequence valve 10 and the reservoir. A pilot chamber 3 of the regulator 2 is connected to the line 21 at a point between the sequence valve 10 and the throttle 11 through a pilot line 4. Therefore, the pilot pressure is introduced to the pilot chamber 3 from the sequence valve 10 under the influence of the throttle 11.

An auxiliary pump 15 is connected with the down stream line 6" of the high pressure line 6 through a delivery line 16. In 5 the delivery line 16 a check valve 17 is interposed and the delivery line 16 is divided into two parts, namely an upper stream line 16' and a down stream line 16" by the check valve 17.

A second relief valve 22 is interposed in a line 30 connected to the upper stream line 6' and the reservoir parallel to the line 21 connected with the sequence valve 10. A directional control valve 19 is interposed to a branch line connected to a pilot chamber of the second relief valve 22 and the reservoir. A pilot chamber of the directional control valve 19 is connected with the line 21 between the sequence valve 10 and the throttle 11 and the pilot pressure for changing over the directional control valve 19 is introduced from the sequence valve 10 to the pilot chamber of the directional control valve 19.

Figure 7:
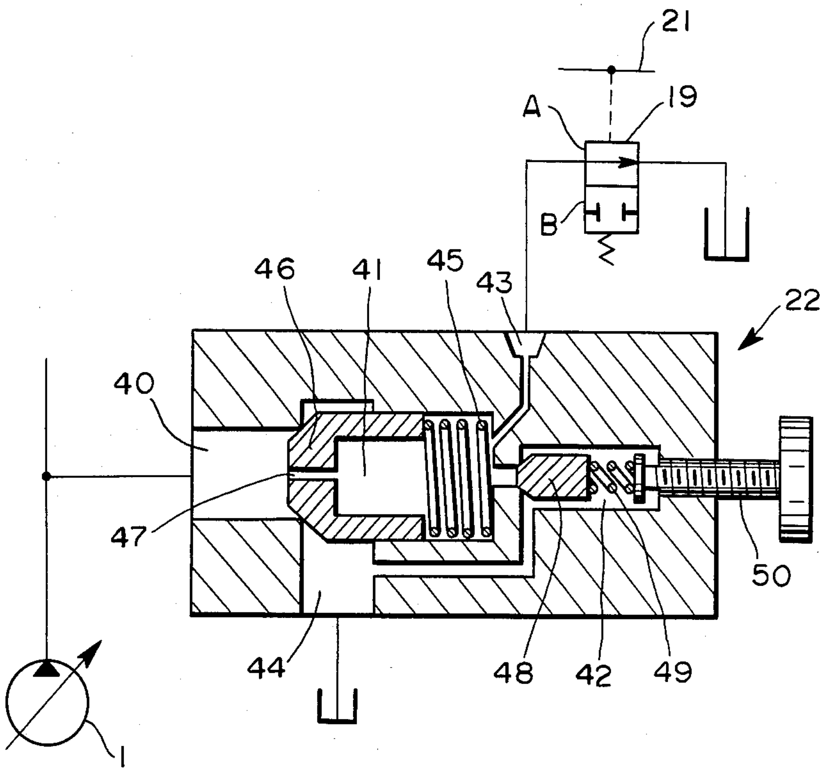
FIG. 7 is a schematic drawing of a second relief valve of the present invention.

The second relief valve 22 as shown in FIG. 7 includes three chambers 40, 41, 42 communicating with each other, a vent port 43 communicating with the chamber 41. The chamber 40 communicates with the main pump 1, while an outlet port 44 communicates with a reservoir as well as the chamber 42. The vent port 43 communicates with the directional control valve 19.

A spring 45 and a balance piston 46 having a through hole 47 are situated in the chamber 41 so that the balance piston 46 is urged toward the chamber 40 by means of the spring 45. A pilot valve 48 and a spring 49 for urging the pilot valve 48 toward the chamber 41 are situated in the chamber 42. A set screw 50 is connected to the valve 22 to change strength of the spring 49.

When no pressure is applied to the system, the balance piston 46 in the chamber 41 is pushed against the chamber 40 by means of the spring 45, and the pilot valve 48 is pushed against the chamber 41 by means of the spring 49. Consequently, the chamber 41 communicates with the chamber 40 through the through hole 47 and with the vent port 43. The chamber 41 does not communicate with the chamber 42 and the outlet port 44, the outlet port communicating with the chamber 42.

Assuming that the set pressure of the relief valve 22 will be represented as $P_{22}$, the set pressure of the sequence valve 18 as $P_{18}$, the set pressure of the sequence valve 10 as $P_{10}$, the set pressure of the pilot pressure required for changing over the directional control valve 19 as $P_{19}$, and the pressure sufficient enough to compress the spring 5 of the regulator 2 to the stopper position as $P_3$ respectively, the following relations should be established.

$$P_{18}>P_{22}>P_{10}>P_{19}>P_3$$

$P_{10}>$[(The pressure required at the side of actuators 7)]

Furthermore, on the pressure $P_{18}$ the delivery volume Q of the auxiliary pump 15 is selected as following, and the auxiliary pump should be selected from the lower noise and longer life pumps, for example, screw pumps.

Q>[(Flow rate from the throttle 11 under the pressure $P_{18}$)+(Leakage from the respective devices)]

Now the operation of the parallel multiple circuit arrangement comprising the above construction will be described. When the actuators 7 are at "stand-by" condition the actuators do not require any volume of fluid, so the hydraulic pressure sure of the upper stream line 16′ and the down stream line 16″ of the delivery line 16 and the high pressure line 6″ will be all held on the pressure $P_{18}$ due to the auxiliary pump 15, and the sequence valve 10 will naturally open in accordance with the above relative equation and as the result the hydraulic pressure in the pipe line 21 and the pilot line 4 will be also held on the pressure $P_{18}$. Accordingly the directional control valve 19 will be changed over to position A as illustrated in FIG. 4, the hydraulic pressure in the high pressure line 6 at the deiivery side of the main in pump 1 will be held almost zero and the spring in the regulator 2 will be compressed to the tilted position equivalent to minimum delivery due to the hydraulic pressure P18 in the pilot line 4 whereby the main pump 1 can be operated with minimum delivery and at the pressure almost zero. Namely, when the valve 19 takes the position A, fluid in the chamber 41 is exhausted to the reservoir through the vent port 43 and the valve 19. Consequently, fluid from the main pump 1 pushes the balance piston 46 toward the chamber 42 against the force of the spring 45, whereby fluid from the main pump 1 flows to the receiver through the chamber 40 and the outlet port 44.

When the actuators 7 are in the "operative" conditions, the auxiliary pump 15 cannot afford the volume of fluid to be consumed by the actuators. To supplement this deficiency of the fluid volume, the hydraulic pressure in the delivery line 16 and the high pressure line 6 will be reduced, whereby the sequence valve 10 will be closed and the hydraulic pressure in the pipe line 21 will be reduced to lower level than the pilot pressure $P_{19}$ for changing-over of the valve 19 causing the directional control valve 19 to be changed to the position B. Consequently, the balance piston 46 is pushed toward the chamber 40 by means of the spring 45, because fluid in the chamber 41 is not exhausted to the reservoir. In this position, pressure in chamber 40 is equal to pressure in chamber 41 since the chambers 40, 41 communicates with each other through the hole 47. Fluid in the chamber 40 does not flow to the reservoir through the outlet port 44. As the result, the relief valve 22, namely the pilot valve 48 will be set to the pressure $P_{22}$ by means of the spring 49. In this situation, when extremely high pressure fluid is applied to the relief valve 22 from the main pump 1, high pressure fluid passign through the chambers 40. 41 pushes the pilot valve 48 against the force of the spring 49 to thereby exhaust fluid in the chamber 41 to the reservoir through the chamber 42. Consequently, the balance piston 46 moves toward the chamber 42, so that the high pressure fluid from the main pump 1 is exhausted to the reservoir through the chambers 40, 41 and the outlet port 44. When the high pressure fluid is exhausted, the pilot valve 48 is automatically closed. Then, the balance piston 46 is moved toward the chamber 40, and fluid from the main pump 1 does not flow to the reservoir. As understood clearly from the above relative formula, all hydraulic pressure which will work for all lines from the main pump 1 through the high pressure lines 6 in communication with the actuators 7 are now to be governed by the sequence valve 10. In other words, in this case, the pressure in the high pressure lines 6, is regulated by $P_{10}$ and a small quantity of fluid will flow from the sequence valve 10 to the pipe line 21. Subsequently pressure will be generated in the pipe line 21 and the pilot line 4 and the pilot chamber by the throttle 11 and the pressure will work against the spring 5 of the regulator. Thus the delivery volume of the main pump is so controlled that the total volume of the fluid of the delivery from the main pump 1 and the auxiliary pump 15 may be equalized to the aggregate volume of the fluid required for activation of the actuators, the flow rate through the throttle and the inner leackage of the respective devices.

The circuit according to the present invention is so constructed as explained above that in case that the actuators are in "stand-by" condition, the main pump may be switched over to unloaded condition and in case that the actuators are in "operative" condition, the main pump may be switched over to loaded condition. In this manner, various problems relating to noise and the vibration caused by main pump at its operation at a high pressure as well as shortening of the life time of the main pump during the time the actuators are in "stand-by" condition may be solved. In addition, the change-over operation of the main pump may be carried out automatic and besides the effective function of the multiple circuit arrangement may be improved, and thus excellent effect may be obtained.

In the above-cited embodiment, the directional control valve 19 has been illustrated as a hydraulic directional control valve. However, it is clear that the valve 19 may be replaced with a combination of a pressure switch and a solenoid directional control valve.

Figure 2:
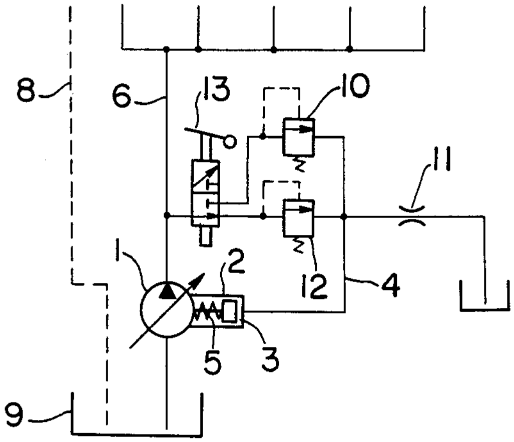
FIG. 2 PRIOR ART
FIG. 2 is a schematic diagram of another example of the arrangement according to the prior art.
Figure 5:
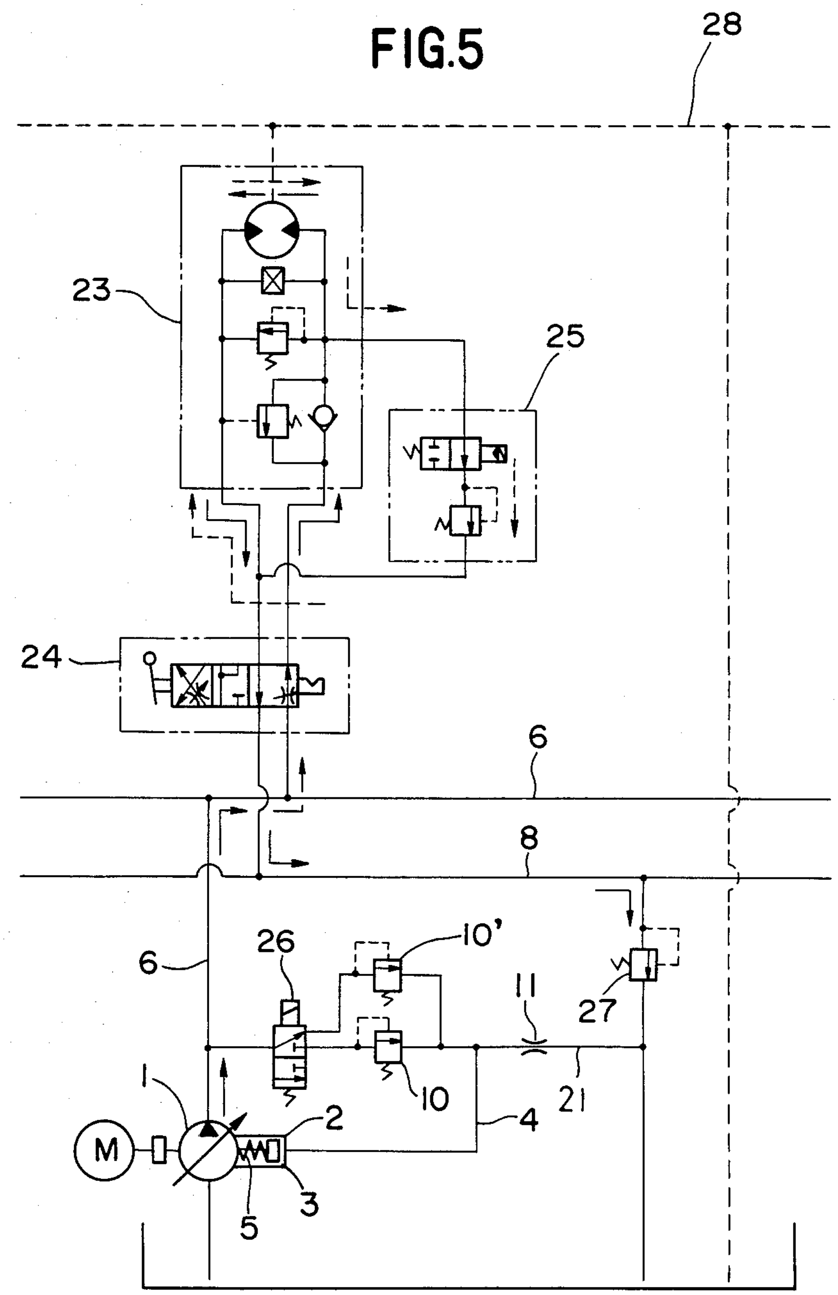
FIG. 5 is a flow diagram showing an example of the application of the parallel multiple circuit arrangement according to the prior art.

When the apparatus according to this invention will be applied to the operational circuit for the hydraulic machinery for marine use, excellent effect may be expected by using for the automatic tension apparatus. With regard to this application, description will next be made referring to the illustrated embodiment. FIG. 5 shows the parallel multiple circuit arrangement according to the prior art which is used as the actuators for the mooring winch with the automatic tension apparatus. In the drawing, the parallel multiple circuit arrangement in FIG. 2 is used. The numeral 23 designates the mooring winch, numeral 24 designates the directional control valve for the mooring winch and numeral 25 designates the valve unit of automatic tension. Numeral 26 designates the directional control valve corresponding to the directional control valve 13 in FIG. 2. By changing over the valve 26, regulation of the pilot pressure introduced into the pilot chamber 3 through the pilot line 4 may be switched from the pressure caused by the sequence valve 10 over to the pressure caused by a second sequence valve 10. Numeral 27 designates the relief valve which boosts the pressure for the discharged fluid line 8. Numeral 28 designates the drain line. In the drawing, the arrows in the solid line indicates the direction of fluid flow in case of winding of the winch, while the arrows in the broken line indicates the fluid flow in case of winding off of the winch.

In the automatic tension apparatus of the prior art thus arranged, the main pump 1 will deliver the fluid only in case of winding of the winch and the pump 1 will deliver only the amount of fluid for supplementing the fluid flow through the throttle 11 and the leakage in respective devices in case of winding off or being stopped of the winch. Therefore, there will be little fluid flow in case of standstill. In this kind of the apparatus of the prior art, it may be considered an excellent circuit in that minimum required fluid will be delivered by the main pump 1, but it is inconvenient that the main pump has to be always continuously operated. Besides the above respect, the pumps of the type which will be used as the main pump in this field normally have a high level of noise and large pulsation of pump pressure, thus causing still much higher noise. In case of the operational circuit of this kind for marine use in particular, the high pressure pipe line is, in many instances, laid in the vicinity of the residential area. In addition, the period during which the apparatus is put in an automatic tension condition, namely in the automatic mooring condition, is much longer than the period of manual operation. For such reasons, the problems relating to higher noise will be increasingly serious.

Figure 6:
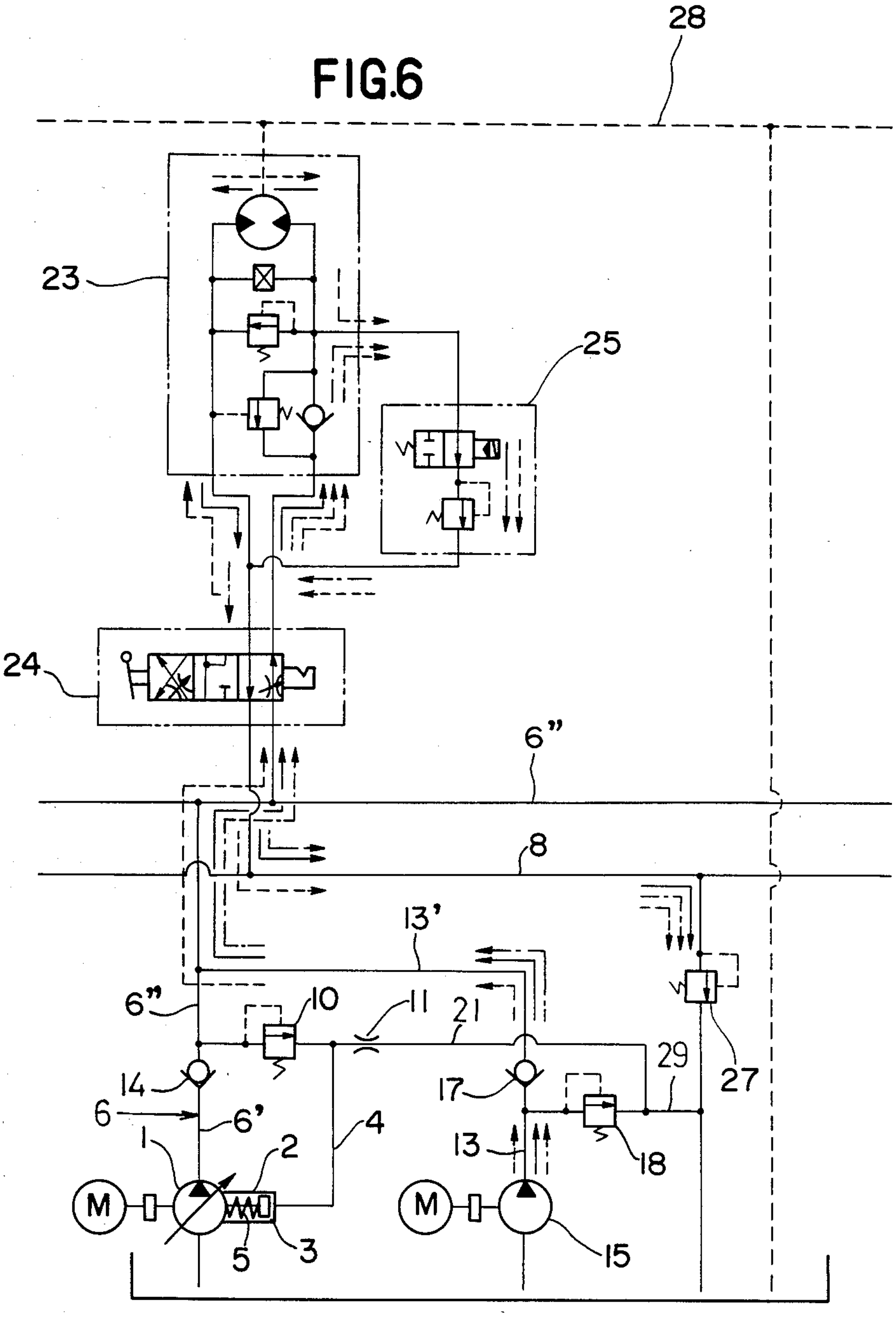
FIG. 6 is a flow diagram showing an example of the application of the parallel multiple circuit arrangement according to the present invention.

The embodiment of automatic tension apparatus to which the present invention is applied in consideration of the above problems is illustrated in FIG. 6. In the drawing, the arrows in the dot-dash line indicates the direction of fluid flow during the standstill condition. In FIG. 6 the parallel multiple circuit arrangement shown in FIG. 3 is used. The mooring winch 23 which is one of the actuators 7 is connected to the down stream line 6″ of the high pressure line 6 and to the fluid discharge line 8 through the directional control valve 24. An automatic tension apparatus 25 is connected with the mooring winch (hydraulic driving circuit) 23. A relief valve 27 is connected between the fluid discharge line 8 and the relief valve 18 for the auxiliary pump 15 and boosts the pressure in the fluid discharge line 8. In FIG. 6 the elements corresponding to the elements shown in FIG. 3 is designated with same numeral as in FIG. 3 and the detailed explanation is omitted. A numeral 28 designates a drain line of the winch 23.

In the arrangement shown in FIG. 6, during the automatic mooring, the main pump 1 is stopped and the auxiliary pump 15 alone is driven, whereby the fluid in the circuit will flow respectively in the direction indicated by the arrows depending on the respective aspects of winding, winding off and standstill of the mooring winch 23, thus performing the expected function as the automatic tension apparatus. Contrary to the main pump 1, the auxiliary pump 15 has lower level of noise and less pulsation of pump pressure. Accordingly the apparatus of this embodiment may remarkably reduce generation of noise in automatic mooring compared to the circuit according to the prior art as illustrated in FIG. 5.

What is claimed is:

1. Hydraulic circuit arrangement for operating a plurality of actuators by means of a pressurized fluid, comprising a variable displacement type main pump having a regulator attached thereto for controlling the discharge rate of the main pump while holding the pressurized fluid from the main pump constant, said main pump including a high pressure line extending from the main pump to the actuators for transmitting the pressurized fluid to the actuators to substantially operate all the actuators by the pressurized fluid from the main pump when operated, a check valve situated in said high pressure line to prevent the pressurized fluid from flowing back to the main pump, said check valve dividing the high pressure line into a pump line and an actuator line, an auxiliary pump having a delivery line connected to said actuator line, said auxiliary pump transmitting pressurized fluid to the actuator line at a pressure higher than that of the main pump, volume of the pressurized fluid from the auxiliary pump being less than that of the main pump, means for controlling the regulator situated between the actuator line and the regulator to change the operating condition of the main pump so that when the actuators are not operated, the pressurized fluid from the auxilary pump flows into the regulator thorugh the means for controlling the regulator to thereby operate the main pump at a minimum operating condition, and when the actuators are operated, the pressurized fluid from the auxiliary pump flows into the actuators and substantially no pressurized fluid flows into the regulator through the means for controlling the regulator to thereby operate the main pump at a regular operating condition, said means for controlling the regulator substantially preventing the pressurized fluid of the main pump from passing therethrough when the main pump fully operates, whereby the actuators are operated by the pressurized fluid flowing from the main pump and the auxiliary pump, and means for relieving the main pump pressure situated between the pump line and the downstream side of the means for controlling the regulator so that when the pressurized fluid from the auxiliary pump is applied to the regulator, the pressure relieving means operates to allow the fluid from the main pump to pass therethrough for exhausting the fluid outwardly, and when the pressurized fluid from the auxiliary pump is not substantially applied to the regulator, the pressure relieving means operates to allow the fluid from the main pump to flow to the actuators, said pressure relieving means including a relief valve connected to the pump line for exhausting the pressurized fluid outwardly, and a directional control valve connected between the relief valve and the downstream side of the means for controlling the regulator, said directional control valve, when detecting the pressurized fluid above a predetermined pressure passing through the regulator control means, allowing the relief valve to open for exhausting the fluid from the main pump outwardly, and when detecting the pressurized fluid below the predetermined pressure passing through the regulator control means, allowing the relief valve to cloase for directing the fluid from the main pump to the actuators, the relief valve being automatically opened to relieve pressure in the pump line when pressure in the pump line exceeds a predetermined level.

2. Hydraulic circuit arrangement according to claim 1, further comprising an auxiliary check valve disposed in said delivery line to prevent the pressurized fluid from flowing back to the auxiliary pump, and an auxiliary relief valve connected to said delivery line between the auxiliary pump and the auxiliary check valve to regulate the fluid pressure from the auxiliary pump.

3. Hydraulic circuit arrangement according to claim 2, in which said means for controlling the regulator comprises a sequence valve situated between the actuator line and the regulator, a by-pass line connected at one end between the sequence valve and the regulator for exhausting excess fluid outwardly, and a throttle situated in said by-pass line.

* * * * *